US012775618B2

(12) United States Patent
Lee et al.

(10) Patent No.: US 12,775,618 B2
(45) Date of Patent: Oct. 27, 2026

(54) SYSTEM FOR ACCELERATING DATA COMPUTATION AND RETRIEVAL

(71) Applicant: Dnotitia Inc., Seoul (KR)

(72) Inventors: Seung Jae Lee, Hwaseong-si (KR); Moo Kyoung Chung, Yongin-si (KR); Hong Chan Roh, Seongnam-si (KR)

( * ) Notice: Subject to any disclaimer, the term of this patent is extended or adjusted under 35 U.S.C. 154(b) by 0 days.

(21) Appl. No.: 19/179,232

(22) Filed: Apr. 15, 2025

(65) Prior Publication Data

US 2025/0328530 A1 Oct. 23, 2025

(30) Foreign Application Priority Data

Apr. 15, 2024 (KR) ........................ 10-2024-0049955

(51) Int. Cl.
*G06F 16/2453* (2019.01)
*G06F 16/22* (2019.01)

(52) U.S. Cl.
CPC .... *G06F 16/24542* (2019.01); *G06F 16/2237* (2019.01)

(58) Field of Classification Search
CPC ........... G06F 16/24542; G06F 16/2237; G06F 16/24569; G06F 9/30036; G06F 16/31; G06F 16/3347; G06N 3/042; G06N 3/045; G06N 3/063
USPC .......................................................... 707/715
See application file for complete search history.

(56) References Cited

U.S. PATENT DOCUMENTS

2011/0202725 A1* 8/2011 Rose .................. G06F 9/30018 711/E12.017
2014/0156337 A1* 6/2014 Pechanec ............... G06Q 10/06 705/7.27
2024/0054384 A1 2/2024 Catron et al.

FOREIGN PATENT DOCUMENTS

KR 10-2020-0100672 A 8/2020

OTHER PUBLICATIONS

Notification of Reasons for Refusal (Office Action) issued by the Korean Intellectual Property Office in counterpart Korean Patent Application No. 10-2024-0049955, dated May 11, 2026, machine translation attached.

* cited by examiner

*Primary Examiner* — Cam Y T Truong
(74) *Attorney, Agent, or Firm* — USX IP LLC

(57) ABSTRACT

Provided are a method and system of operating a machine learning algorithm with vector data in a data computation and retrieval system including a data processing accelerator that processes input data using machine learning and a data retrieval accelerator. The method includes operating a first neural network algorithm using input data, retrieving vector data similar to a result obtained by operating the first neural network algorithm, and operating a second neural network algorithm using the retrieved vector data as input data.

9 Claims, 2 Drawing Sheets

SYSTEM FOR ACCELERATING DATA COMPUTATION AND RETRIEVAL

CROSS-REFERENCE TO RELATED APPLICATION

This application claims priority to and the benefit of Korean Patent Application No. 10-2024-0049955, filed on Apr. 15, 2024, the disclosure of which is incorporated herein by reference in its entirety.

BACKGROUND

1. Field of the Invention

The present disclosure relates to a computer system for artificial intelligence computation, and more specifically, to an artificial intelligence computation and retrieval system capable of acceleration of data computation and retrieval.

2. Discussion of Related Art

A data computation accelerator refers to a semiconductor chip that accelerates data computation, or a computer system that utilizes the semiconductor chip, and representative examples thereof include a graphics processing unit (GPU) and a neural processing unit (NPU) that accelerate machine learning or artificial intelligence technique, and a computer system that employs these units.

Representative examples of a data storage and retrieval system include a system, a database, and a search engine that store and retrieve data. In particular, a database and a machine learning or artificial intelligence system that store and retrieve vector data are widely used in recent artificial intelligence applications, because they handle data in vector form.

SUMMARY OF THE INVENTION

The present disclosure is directed to providing a data computation and retrieval accelerator system capable of increasing system efficiency by integrating and accelerating data computation, data storage, and data retrieval.

According to an aspect of the present disclosure, there is provided a data computation and retrieval accelerator system including a data processing accelerator that process input data using machine learning algorithm and a data retrieval accelerator, wherein vector data is processed using a machine learning algorithm. At this time, a first neural network algorithm is operated using input data, vector data similar to a result obtained by operating the first neural network algorithm is retrieved, and a second neural network algorithm is operated using the retrieved vector data as input data.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
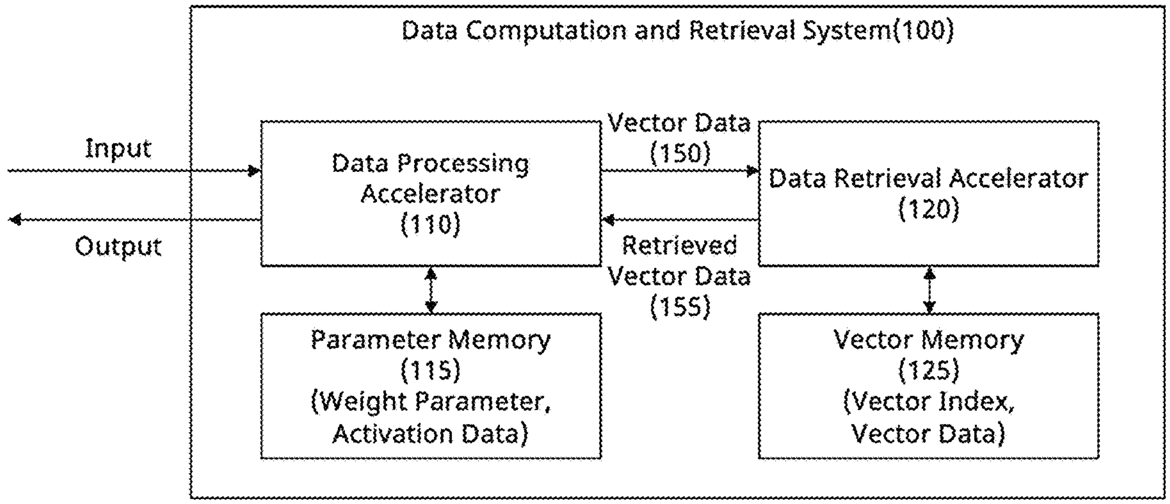
FIG. 1 is a block diagram illustrating a data computation and retrieval accelerator system according to an embodiment of the present disclosure.

Terms used in the present specification will be briefly described, and an embodiment of the present disclosure will be described in detail. In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

The terms "module" and "part" used for components in the following description are given or mixed together only considering the ease of creating the specification, and have no meanings or roles that are distinguished from each other by themselves. In addition, in the description of the present disclosure, when it is determined that the detailed description of the related art would obscure the gist of the present disclosure, the detailed description thereof will be omitted.

Throughout the specification, when a part is described to be "connected (linked, contacted, joined)" to another part, this includes not only the case where it is "directly connected" but also the case where it is "indirectly connected" with another member therebetween. Also, when a part is described to "include" a certain component, this does not mean that other components are excluded, unless otherwise specifically stated, but that other components may be included.

The terminology used herein is for the purpose of describing particular embodiments only and is not intended to limit the present invention. An expression used in the singular encompasses the expression of the plural, unless it has a clearly different meaning in the context. In the present specification, it is to be understood that terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The terms including ordinal numbers such as "first," "second," etc., used in this specification, may be used to describe various components, but the components shall not be limited by these terms. These terms may be used for distinguishing one component from another component. For example, without departing from the scope of the present invention, the first component may be referred to as the second component, and similarly, the second component may also be referred to as the first component.

FIG. 1 is a block diagram illustrating a data computation and retrieval accelerator system according to an embodiment of the present disclosure.

Referring to FIG. 1, a data computation and retrieval system 100 includes a data processing accelerator 110 and a data retrieval accelerator 120.

The data processing accelerator 110 processes data by utilizing machine learning. At this time, the data processing accelerator 110 may further include a parameter memory 115, and stores weight parameters or activation data required for data processing in the parameter memory 115 and utilizes the stored data.

For example, when input data is input to the data computation and retrieval system 100, the data processing accelerator 110 reads the weight parameters in the parameter memory 115 and operates the machine learning algorithm based on the weight parameters. At this time, the generated activation data is also temporarily stored in the parameter memory and utilized. A result value obtained by operating the machine learning algorithm by the data processing accelerator 110 is vector data 150, and the vector data 150 is transmitted to the data retrieval accelerator 120.

The data retrieval accelerator 120 according to the present disclosure stores the vector data 150 transmitted from the data processing accelerator 110. In addition, the data retrieval accelerator 120 may further include a vector memory 125, and stores vector indexes and vector data required for storing and retrieving vector data in the vector memory 125 and utilizes the stored data.

The data retrieval accelerator 120 may store the transmitted vector data 150 in the vector memory 125 and update the previously stored vector indexes.

In addition, the data retrieval accelerator 120 may utilize the updated vector indexes to retrieve vector data highly relevant to the transmitted vector data 150, and transmit the retrieved vector data 155 to the data processing accelerator 110. As an example, machine learning may be used to retrieve the vector data highly relevant to the transmitted vector data 150.

That is, the data processing accelerator 110 transmits the vector data 150, which is the result value obtained by operating the machine learning algorithm, to the data retrieval accelerator 120, and receives the vector data 155 retrieved by the data retrieval accelerator 120 from the data retrieval accelerator 120.

Next, the data processing accelerator 110 receives the retrieved vector data 155 transmitted from the data retrieval accelerator 120, i.e., highly relevant vector data, and operates the machine learning algorithm once again.

According to the present disclosure, operations of operating a first neural network algorithm using input data, retrieving vector data similar to a result obtained by operating the first neural network algorithm, and operating a second neural network algorithm using the retrieved vector data as input data are repeated at least once to generate final output data.

Figure 2:
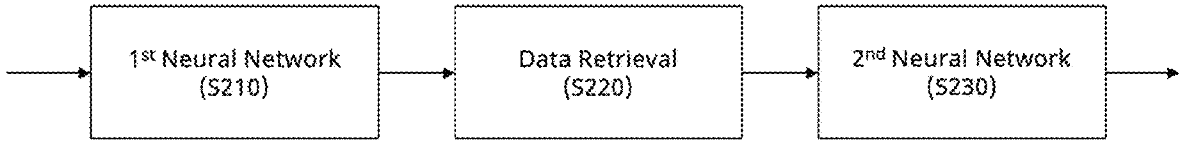
FIG. 2 is a flowchart illustrating an example of operating a data computation and retrieval accelerator system according to the present disclosure.

FIG. 2 is a flowchart illustrating an example of operating a data computation and retrieval accelerator system according to the present disclosure.

Referring to FIG. 2, a first neural network algorithm is operated using input data in operation S210. Vector data similar to a result obtained by operating the first neural network algorithm is retrieved in operation S220, and a second neural network algorithm is operated using the retrieved vector data as input data in operation S230.

According to the present invention, when the first neural network algorithm is operated, the parameters of a first neural network are stored in the parameter memory of the data processing accelerator. At this time, the data processing accelerator uses weight parameters stored in the parameter memory and stores activation data in the parameter memory to operate the machine learning algorithm, thereby generating vector data.

When the vector data generated from the first neural network is transmitted to the data retrieval accelerator, the data retrieval accelerator uses a vector retrieval algorithm to retrieve one or more pieces of the most relevant vectors from among the vector data in the vector memory. At this time, the data retrieval accelerator reads and utilizes vector index data and vector data stored in the vector memory. At this time, the data retrieval accelerator transmits one or more pieces of the retrieved vector data to the data processing accelerator.

The data processing accelerator operates a second neural network algorithm using the vector data received from the data retrieval accelerator. At this time, similar to the operation of the first neural network algorithm, when the second neural network algorithm is operated, the parameters of a second neural network are stored in the parameter memory of the data processing accelerator. At this time, the data processing accelerator uses the weight parameters stored in the parameter memory and stores the activation data in the parameter memory to operate the machine learning algorithm, thereby generating the vector data.

In this manner, the vector data generated by operating the second neural network algorithm is output as output data.

As an example according to the present invention, the data processing accelerator and the data retrieval accelerator may be each configured as a separate block within a single semiconductor die. Alternatively, the parameter memory and the vector memory may be configured as a SRAM within the same semiconductor die, as separate DRAMs, or as a hybrid form of the two.

In another example according to the present invention, the data processing accelerator and the data retrieval accelerator may be each implemented in a different semiconductor die. The parameter memory and the vector memory may be configured as a SRAM in the same semiconductor die as the data processing accelerator or the data retrieval accelerator, as separate DRAMs, or as a hybrid form of the two.

In still another example according to the present invention, the data processing accelerator and the data retrieval accelerator may be integrated in the form of chiplets within a single package, or may be implemented as separate chips and combined and integrated in a PCB board.

In yet another example according to the present invention, the data processing accelerator and the data retrieval accelerator may be implemented as separate chips. In addition, the parameter memory and the data processing accelerator may be configured as a SRAM within the same semiconductor die, as separate DRAMs, or as a hybrid form of the two. In addition, the vector memory may be configured as a SRAM within the same semiconductor die as the data retrieval accelerator, as separate DRAMs, or as a hybrid form of the two. These components may be integrated within a single PCB board or may be configured as a single system by interconnecting different PCB boards.

Figure 3:
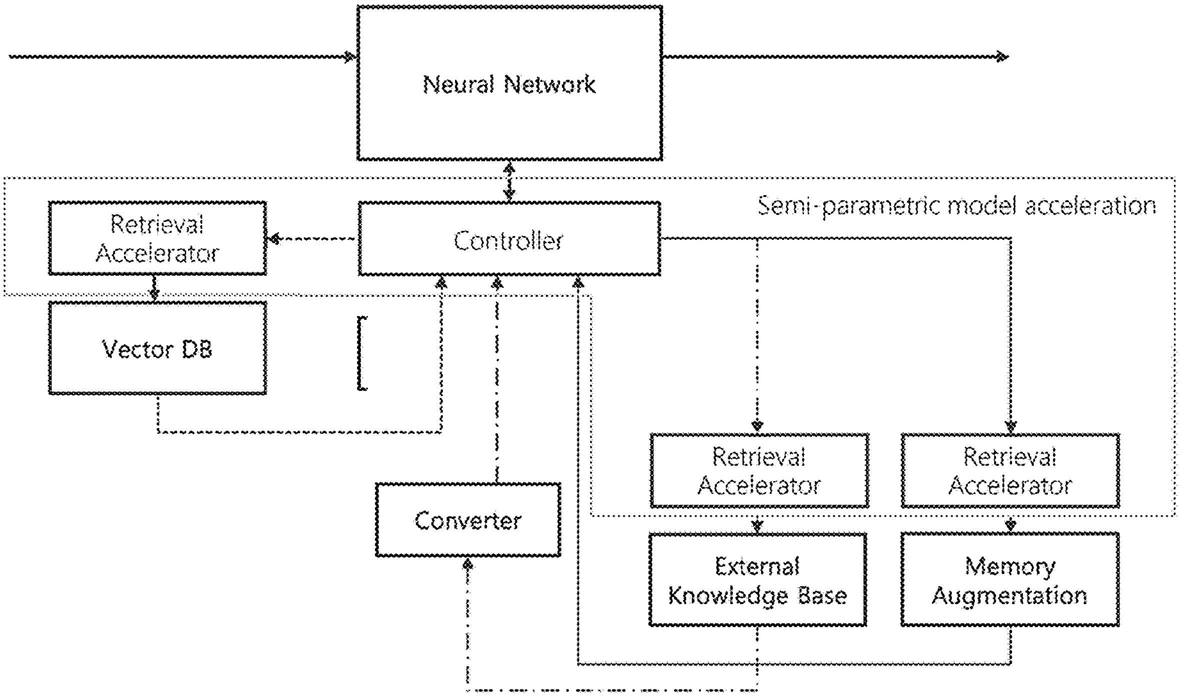
FIG. 3 illustrates an example of hardware acceleration for a semi-parametric model according to the present disclosure.

FIG. 3 illustrates an example of hardware acceleration for a semi-parametric model according to the present disclosure.

According to the present invention, when there is input or access related to not only a vector database but also an external knowledge base or memory augmentation to a neural network, it is possible to enhance the memory for long-term context by efficiently retrieving pre-stored parameters to utilize external knowledge, or to store the computational results of the neural network in the form of parameters. This is because the role of the accelerator is important because the larger the knowledge base size, the larger the retrieval target group becomes.

Referring to FIG. 3, there are three types of retrieval methods in a semi-parametric model, and retrieval accelerators 310, 320, and 330 may be connected for each type to accelerate retrieval.

Referring to the flow indicated by the dotted line, the first type retrieval accelerator 310 accelerates retrieval for a vector database 360 to input information to a neural network 300 through a controller 350 as a prompt (e.g., Retrieval augmented generation, RAG).

Referring to the flow indicated by the dashed dotted line, the second type retrieval accelerator 320 inputs information to the neural network through the controller 350 through a converter 375 that aligns a feature domain of the neural network with an external knowledge embedding domain, while accelerating retrieval for an external knowledge base 370 in the calculation process of the neural network to input information to the neural network.

Referring to the flow indicated by the solid line, the third type retrieval accelerator 330 stores part of a computational result of the neural network in a form that enables vector retrieval in a memory and inputs the stored result to the neural network through the controller 350 in a memory augmentation 380 that maintains memory for long-term context.

According to the present invention, retrieval acceleration is performed through one or more of the first to third types of accelerators 310, 320, and 330 by the controller 350. In particular, performing retrieval acceleration through the second type accelerator 320 or the third type accelerator 330 is called semi-parametric model acceleration.

As an example according to the present invention, the controller 350 and one or more types of retrieval accelerators 310, 320, and 330 may be implemented in a single chip or similar form thereof, and connected to the vector database 360, the external knowledge base 370 and a converter 375, and the memory augmentation 380 to perform hardware acceleration for a semi-parametric model.

According to the present invention, data computation, data storage, and data retrieval may be integrated and accelerated to increase system efficiency.

The preferred embodiments of the present invention described above are disclosed for purposes of illustration, and those skilled in the art with ordinary knowledge of the present invention will be able to make various modifications, changes and additions within the features and scope of the present invention, and such modifications, changes and additions should be construed to be included in a scope of the claims.

When those skilled in the art to which the present invention belongs, various substitutions, modifications, and changes are possible within the scope of the technical features of the present invention, and thus the present invention is not limited by the embodiments described above and the accompanying drawings.

What is claimed is:

1. A data computation and retrieval accelerator system for artificial intelligence computation, comprising:

a data processing accelerator configured to process, by implementing a first neural network, input data that is inputted to the system, wherein the data processing accelerator:

(i) includes a parameter memory, (ii) stores, in the parameter memory, weight parameters required for the processing of the input data, (iii) reads the weight parameters in the parameter memory to operate the first neural network algorithm based on the weight parameters, (iv) stores, in the parameter memory, activation data generated when the first neural network algorithm is operated in the parameter memory based on the weight parameters, and (v) transmits the vector data obtained by operating the first neural network algorithm to a data retrieval accelerator; and the data retrieval accelerator configured to retrieve vector data based on the vector data transmitted from the data processing accelerator, wherein the data retrieval accelerator:

(i) includes a vector memory, (ii) receives the transmitted vector data from the data processing accelerator, (iii) stores, in the vector memory, vector indexes for storing and retrieving vector data and the vector data transmitted from the data processing accelerator, (iv) updates the stored vector indexes, (v) retrieves vector data highly relevant to the vector data transmitted from the data processing accelerator by utilizing the updated vector indexes, and (vi) transmits the retrieved highly relevant vector data back to the data processing accelerator;

wherein the data processing accelerator operates a second neural network algorithm using the retrieved highly relevant vector data as input data of the data processing accelerator to generate final output data, wherein when the second neural network algorithm is operated, parameters of a second neural network are stored in the parameter memory of the data processing accelerator, wherein the data processing accelerator and the data retrieval accelerator are implemented in a single semiconductor die or different semiconductor dies, and wherein the parameter memory and the vector memory are configured (i) as Static Random-Access Memories (SRAMs) in the single semiconductor die, (ii) as separate Dynamic RAMs (DRAMs), or (iii) as a combination of an SRAM and a DRAM.

2. The data computation and retrieval accelerator system of claim 1, wherein the data processing accelerator and the data retrieval accelerator are configured as separate blocks in the single semiconductor die.

3. The data computation and retrieval accelerator system of claim 2, wherein the parameter memory in the data processing accelerator and the vector memory in the data retrieval accelerator are configured as a SRAM in a same semiconductor die.

4. The data computation and retrieval accelerator system of claim 1, wherein the data processing accelerator and the data retrieval accelerator are implemented in a different semiconductor dies.

5. The data computation and retrieval accelerator system of claim 4, wherein the parameter memory in the data processing accelerator and the vector memory in the data retrieval accelerator are implemented as a hybrid form.

6. The data computation and retrieval accelerator system of claim 1, wherein the data processing accelerator and the data retrieval accelerator are integrated in a form of chiplets in a single package, or are implemented as separate chips.

7. The data computation and retrieval accelerator system of claim 1, wherein the data processing accelerator and the data retrieval accelerator are implemented as different chips.

8. The data computation and retrieval accelerator system of claim 7, wherein the vector memory in the data retrieval accelerator is configured as an SRAM in the single semiconductor die.

9. The data computation and retrieval accelerator system of claim 8, wherein the data processing accelerator and the data retrieval accelerator are integrated into a single board, or configured as a single system by connecting different boards.

* * * * *